United States Patent [19]
Crocker, III et al.

[11] Patent Number: 6,128,019
[45] Date of Patent: Oct. 3, 2000

[54] REAL-TIME MULTI-SENSOR SYNTHETIC ENVIRONMENT CREATED FROM A FEATURE AND TERRAIN DATABASE USING INTERACTING AND UPDATABLE ABSTRACT MODELS

[75] Inventors: John A. F. Crocker, III; Roderic C. Deyo; Paul L. Isaacson; Serge J. Olszanskyj, all of Salt Lake City, Utah

[73] Assignee: Evans & Sutherland Computer Corp., Salt Lake City, Utah

[21] Appl. No.: 09/053,835

[22] Filed: Apr. 1, 1998

[51] Int. Cl.[7] .................................................. G06T 15/00
[52] U.S. Cl. ............................................. 345/419; 345/425
[58] Field of Search ....................................... 345/418, 419, 345/420, 421, 422, 423, 424, 425

[56] References Cited

U.S. PATENT DOCUMENTS

| | | | |
|---|---|---|---|
| 5,838,328 | 11/1998 | Roller | 345/420 |
| 5,917,495 | 6/1999 | Doi et al. | 345/419 |
| 5,969,721 | 10/1999 | Chen et al. | 345/419 |
| 5,969,726 | 10/1999 | Rentschler | 345/419 |

OTHER PUBLICATIONS

Lee R. Willis, Michael T. Jones, Jenny Zhao, "A Method for Continuous Adaptive Terrain", pp. 1–5.

Lori L. Scarlatos, "A Refined Triangulation Hierarchy for Multiple Levels of Terrain Detail", pp. 115–122, 114.

Boris Rabinovich, Craig Gotsman, "Visualization of Large Terrains in Resource–Limited Computing Environments", pp. 95–102.

Peter Lindstrom, Larry F. Hodges, David Koller, Nick Faust, William Ribarsky, Gregory A. Turner, "Real–Time, Continuous Level of Detail Rendering of Height Fields", pp. 109–113, 115, 116, 118.

Michael F. Polis, Stephen J. Gifford, David M. McKeown, "Automating the Construction of Large Scale Virtual Worlds", unnumbered pp. 1–16.

*Primary Examiner*—Phu K. Nguyen
*Assistant Examiner*—Cliff N. Vo
*Attorney, Agent, or Firm*—Thorpe, North & Western, L.L.P.

[57] ABSTRACT

A method for creating a large-scale synthetic environment simulation which can be used in real-time. The method enables real-time viewing, control and interaction of automatically generated, abstract feature models and terrain surface models having multiple levels of detail, while providing correlated multi-sensor viewing and interaction of objects.

35 Claims, 2 Drawing Sheets

REAL-TIME MULTI-SENSOR SYNTHETIC ENVIRONMENT CREATED FROM A FEATURE AND TERRAIN DATABASE USING INTERACTING AND UPDATABLE ABSTRACT MODELS

BACKGROUND

1. The Field of the Invention

The present invention relates generally to real-time management of large-scale synthetic environment simulation. More specifically, the present invention provides real-time viewing, control and interaction of automatically generated, large, terrain and feature models consisting of heterogeneous data sets with multiple levels of detail, while providing correlated multi-sensor viewing and interaction of objects.

2. The State of the Art

To understand the benefits of the present invention, it is useful to briefly analyze a few of the many problems when implementing a large-scale synthetic environment simulation. It is useful when discussing this topic to use the real world application of battlefield simulations because of the substantial benefits which can be reaped from simulation of such environments.

A real-time simulation system must support deterministic, real-time handling of messages and events from both internal and external threads and processes. Because many simulated training tasks often involve controlling and interacting with dynamic entities, the system must support arbitrary real-time behaviors and interactions. A simulation system must support large, correlated, multi-sensor databases in order to supply a rich enough synthetic environment for effective training. It is important to understand that "large" means arbitrary in size, without the restriction of a "small" database which must fit within the system's virtual memory space or within its physical memory. State of the art databases can often exceed 50 Gigabytes of data.

One of the numerous problems in creating a real-time synthetic environment as described above is finding the right entity abstractions or models. If a model is too complex, it generally becomes inefficient and difficult to use. If too simple, its reuse and extension are restricted. Once the correct model is identified, it is then necessary to construct a database that will support multiple entity models and their relations. Ideally, the database provides multiple model transformations, multiple correlated views and incremental updating.

It is also essential that modeled entities behave correctly. Dynamic models, such as terrain and atmospheric effects, must act and interact in all important aspects as would the real-world entities if valid training is to occur.

What is lacking in the state of the art is a system which combines many disparate features which are typically spread throughout various applications for creating a large database. Furthermore, this combination of features should provide the ability to create the large database for a real-time synthetic environment which supports multiple models, wherein the models can all be based on a given set of source data, whether that data source defines terrain and/or a feature. A feature model should contain sufficient information such that one feature model can interact with another feature model without intervention. Likewise, a terrain model should provide the same information to enable automatic terrain-terrain interaction between terrain models without intervention by a user. Once modeled, the feature models and terrain models should be able to be localized to small regions of interest. The localized feature and terrain data should then be capable of being merged together where the features are reconciled with the local terrain upon which they rest to create at least a partially reconciled database. Furthermore, the database should provide the ability to be incrementally updated by modifying a single feature or terrain model without having to recompile the entire database.

OBJECTS AND SUMMARY OF THE INVENTION

It is an object of the present invention to provide a method for generating abstract models wherein a given set of source data is used to generate a plurality of different models.

It is another object to provide a method for generating a plurality of sub-models based on a single abstract model.

It is another object to provide a method for generating an abstract model which has all the attributes necessary to define its behavior with another other abstract model without intervention.

It is another object to provide a method for independently processing features and terrain data so as to maximize abstract model independence.

It is another object to provide a method for localizing a synthetic environment to thereby create regions of interest where a high level of detail can be developed for several purposes including, but not limited to 1) optimizing the step of feature-terrain interaction; 2) optimizing a final model result for subsequent rendering; 3) establishing a unit for incremental updating; and establishing an atomic unit for level-of-detail (LOD) selection.

It is another object to provide a method for merging feature and terrain abstract models to complete interaction therebetween.

It is another object to provide a method for generating a database in which only desired regions of interest are completely reconciled.

It is another object to provide a method for simultaneously processing a plurality of different models, regardless of whether or not they are based on a same data source.

It is another object to provide a method for not allowing feature-feature interaction and terrain-terrain interaction at any particular step before database reconciliation.

It is another object to provide a method for enabling object interaction without necessarily providing a set of external interaction rules for the objects.

It is another object to provide a method for creating a large database which is not economically stored in physical memory space.

These and other objects of the invention are realized in a method for creating a large-scale synthetic environment simulation which can be used in real-time. The method enables real-time viewing, control and interaction of automatically generated abstract feature models and terrain surface models having multiple levels of detail, while providing correlated multi-sensor viewing and interaction of objects.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The present invention is a tool and a method for using that tool to create, modify and view a terrain database for a real-time three-dimensional (3D) synthetic environment simulation. Therefore, it is sufficient to describe how the database functions in order to enable those skilled in the art to make and use the present invention. This is because providing all of the integrated database creation functions, and how the feature and terrain models are used and caused to interact which provide the fundamental advantages and true novelty. For this reason, the software which provides the features of the present invention is called INTEGRATOR.

Before describing the specific novel aspects of the present invention, it is useful to first provide a more general overview of what is accomplished by the present invention. Basically, source data for features and terrain is processed to create renderable objects or models, where abstract feature models are generated independently of terrain surface models. The models contain enough information such that when "caused" to interact, the models determine how they will appear, in all of the possible sensor modes, relative to all other models. The features are then broken up into smaller geographic local units for convenience. The abstract feature models and terrain surface models within each smaller geographical local unit are then merged together, where each unit is a reconciled portion of a larger database which is made up of all the smaller geographic local units. More specific details and advantages which result from use of this method will now be described. What is important to remember is that the models which are used in the present invention need to be efficient in order to render them at the 30 or 60 hertz rendering rate which is typically required for real-time viewing.

Figure 1:
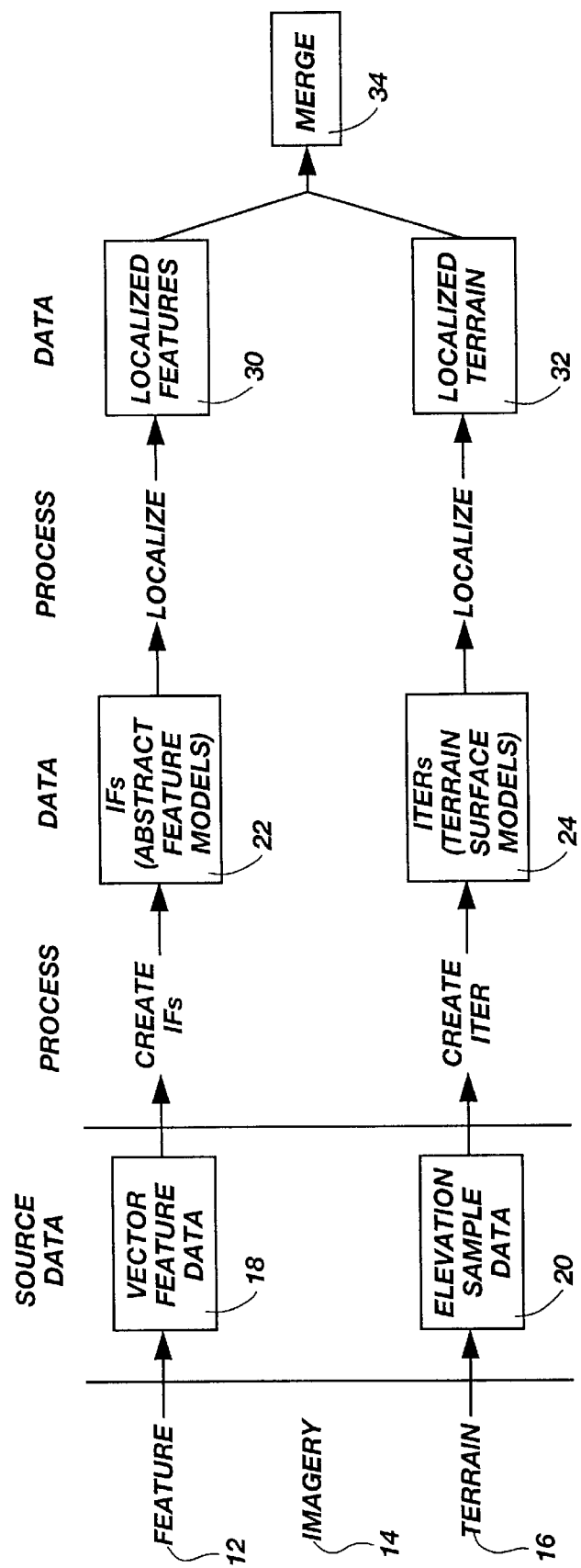
FIG. 1 is a flowchart showing how features and terrain are independently processed and then merged to create a database which is created in accordance with the principles of the preferred embodiment.

FIG. 1 shows that there are three basic elements which are brought together to generate the database in the present invention. They are features 12, imagery 14, and terrain 16. Terrain 16 is basically the surface or elevation of the land upon which features 12 (objects which are not part of the terrain) are placed. Imagery 14 is often known in synthetic environments as texture, where that texture can include photographic data. Generally, features 12 can be assigned textures. However, textures can also be applied to the terrain 16. For the most part, imagery 14 is a topic which is beyond the scope of this document. The description therefore focuses on the difficulties in creating feature and terrain models, not on how to apply textures to feature models or terrain models.

The first step in the process is to obtain source data for the features 12 and terrain 16. An important observation is that the source data is only fundamentally 2D. The processing by the present invention eventually results in 3D renderable data. The source data for features 12 is 2D vector feature data 18, and the source data for terrain 16 comes in the form of elevation sample data 20.

The vector feature data 18 is a skeletal description of an object such as a river, lake, road, fence, water tower, or other cartographic feature. The description is called a vector feature format. For example, a road would be described by a centerline of the road, and a water tank would just be a location or point having coordinates. In contrast, a lake or forest is described by its outline or boundary. The elevation sample data 20 is typically defined as a regularly spaced grid of elevation samples. It should also be mentioned that imagery can not only consist of textures, but visual data such as aerial photography.

A next step of the present invention is to separately process vector feature data 18 and elevation sample data 20. One result of this separate processing is that independence of models is maximized. It is not until a last step of the process that abstract feature models and terrain surface models are merged together.

The vector feature data 18 is brought over directly into a modeling tool whose first step is a process called Create Intermediate Features, or Create IF. The system essentially takes source data that can be in many different forms and converts the source data into its own abstracted internal storage objects that can be retained and queried. The result is an intermediate feature (IF) 22, or abstract feature model. An intermediate feature is any representation of a desired feature. It is not necessarily a 3D representation, but it can be. However, the form of the representation is not relevant. The representation is simply an intermediate step between the original source data and a final renderable 3D model. No special rules are required for any representation. This substantially reduces complexity and increases versatility and adaptability of the system.

An example of a non-3D representation is a texture map associated with a line segment which describes a road or a river. However, source data types needed for building complex synthetic environments for multi-channel sensor simulation generally include terrain surface geometry, terrain feature geometry, terrain photographic imagery, material properties, individual 2D and 3D entity models with appropriate geometry, texture maps and entity material physical properties. What is important is that the present invention provides a common way to handle all types of objects.

In a similar manner, the elevation sample data 20 is also brought over directly into the modeling tool whose first step for the terrain data is a process called Create Intermediate Terrain, or Create ITER. The result of the Create ITER step is also referred to as the creation of the intermediate terrain 24, or of a terrain surface model.

The creation of the intermediate feature 22 and the intermediate terrain 24 data can be described as including a classifying step, where each feature is associated with a set of procedures and data which is called a parametric feature model (PFM). The original source data along with its feature classification and terrain classification provide the PFM with any parameters it needs to compute the particular details of the desired IF 22 and the ITER 24. Because PFMs are parametric and are not fixed in the exact form of their output, a single PFM implementation can be reused to generate many feature instance IFs 22. A PFM can augment or supply any feature information. For example, a road has a specific bridge model over a river, the distance of a forest is cut back from a road. A road might also have the distance a forest is to be cut back from a road. In addition, multi-spectral data, such as the bridge having a specific infrared (IR) or radar signature, might be missing from the original source data. In addition, the choice of the PFM which is applied to source data to create the IFs and ITERs is basically determined by a classification of the source data.

An example of a PFM is an entity-based sweep model. A model is a complete and cohesive structure containing geometry, topology, attribution and procedures. This structure enables entity-based sweep models not only to appear correctly, but to behave as a particular object is supposed to behave within the synthetic environment. The following is a list of the requirements of any model:

The model is a structure of geometry, topology, attribution and procedures.

The model knows how to develop a full three dimensional geometric and topological representation of itself from a skeletal or minimal representation.

The model knows how to correctly map attribution onto this self-generated three dimensional model.

The model knows how to represent itself in several levels of detail.

The model knows how to relate itself to an underlying entity (such as the terrain underneath a feature above).

The model knows how to spatially interact with other models.

PFM processing can be hierarchical and iterative, where a complex PFM may reference itself or simpler PFMs many times to thereby generate the desired IFs 22 and ITERs 24. In the simplest case, the individual IF models are prioritized to reflect the desired or natural inter-feature ordering (such as roads crossing over rivers, rivers are on top of forests, a forest covers soil, etc.) and, if needed, collections of IFs 22 can be blended together (e.g., forests cut back from roads). Where complex or even cyclic interactions between features exist (e.g., a road junction affects each road which then affects the junction, etc.), new IFs 22 may be repeatedly created and interactions reprocessed to produce a final consistent set of IFs 22. It is important to realize that the same processes described above for IFs 22 are also applied to the terrain ITERs 24.

Before proceeding to a next step in the process, it should be mentioned more explicitly that the IFs 22 and the ITERs 24 can be manipulated. For example, the IFs 22 can be caused to interact with each other because a natural order exists. In other words, a forest interacting with a road results in the road cutting through the forest. There is sufficient information contained with the IFs such that it can be determined without intervention how the IFs 22 relate to each other. The models are able to negotiate between themselves how they should appear in any of the channels which can exist for the model. However, it should also be understood that the feature-feature interaction described above does not have to take place at this time. Advantageously, feature-feature interaction can take place at any time up until a last stage where the feature and terrain models are merged together in a process of feature-terrain interaction. Of course, the terrain can also undergo a similar terrain-terrain interaction after creation of the ITERs 24.

THe IFs 22 are modeled with what is referred to as geometry, attributes and topology (GAT). Whereas the vector feature data 18 is not embedded in 3D space, the IFs 22 are fully renderable in a 3D form. Accordingly, all the information needed for describing behavior of a feature is in the IFs 22.

The next step in the process which is applied to the IFs 22 and the ITERS 24 is that of separate feature localization 30 and terrain localization 32, also known as optimization. Localization 30 and 32 is the step of breaking down the IFs 22 and the ITERs 24 into smaller geographic local units. Specifically, this localization step 30 and 32 clips the IFs 22 and the ITERs 24 into disjoint representations so that each "piece" completely resides in an individual geographic local unit or region of interest. These regions of interest are referred to as tiles.

A first observation to make is that a tile does not have to have regular sides. The tile's dimensions can be any desired shape. What is important to understand is that the union of the tiles forms the entire simulation area.

Another important aspect of the invention is that each of the individual localized IFs 22 remains associated to the IF 22 upon which it is based. This aspect makes it possible for changes to be made in, for example, a feature model after all of the IFs 22 have been localized. Furthermore, the change can be made without having to reconcile the entire database as will be explained later.

While most of the explanation has described the processing of features, the processing for terrain is virtually identical. But in addition to ITERs 24, the terrain can also have terrain texture models (ITEX). The resulting intermediate models (ITERs and ITEXs) contain the desired abstract representations of terrain geometry and texture images needed for further processing stages. These models are then formed into 3D models, and then localized (clipped) into the same tile geometry used for abstract feature model localization.

After the abstract feature model, terrain surface model and terrain texture model localization has been completed, the next to last step in the process is a merging of the models 34 for each tile of the synthetic environment. This step resolves or reconciles all interactions between features, texture and terrain. For example, terrain elevation is flattened under a lake, rivers match an underlying texture image and flow downhill, and roads are blended into the terrain. As with feature-feature interactions and terrain-terrain interactions, complex or even cyclic feature-terrain interactions may occur. For example, a road can affect the terrain elevation which then affects the road geometry, etc. Accordingly, new IFs, ITERS, and ITEXs may be repeatedly created and their interactions reprocessed until a desired level of accuracy in the models is achieved. After the merge process is complete 34, the models for features and terrain are complete.

The last step in the process is to convert or tessellate the models into fully attributed polygons, polygons strips and fans, and other primitives for conversion to optimized mission function graphs. The result is a database with unique properties. The individual feature and terrain models can advantageously be modified by referencing back to the IFs, ITERs and ITEXs upon which they are based, without recompiling the entire database.

It has also been mentioned that the database supports visual as well as multi-channel sensors. To support this, there can be more than one abstract feature model for the same vector feature data 18. In other words, a feature can have a visual abstract feature model 26, as well as an IR model, a radar model or any other desired model. These models enable calculation of, in the example of a battlefield simulation environment, mission specific attributes such as height-above terrain, line-of-sight, sound, etc. Accordingly, another of the novel features of the invention is the ability to simultaneously process and make available multiple models from the same source data.

Figure 2C:
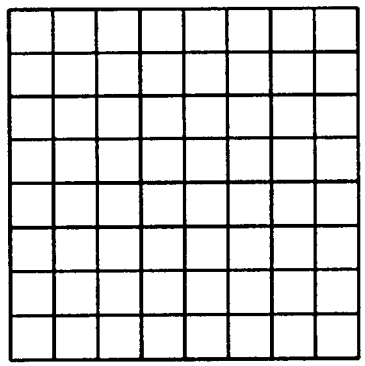
FIG. 2C is a top view of the synthetic environment of FIG. 2B which has been localized to a desired level of optimization.
Figure 2B:
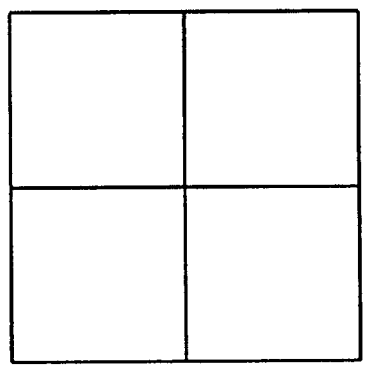
FIG. 2B is a top view of the synthetic environment of FIG. 2A which has been localized (segmented) to enable smaller segments or tiles to be configured independently of the other tiles.
Figure 2A:
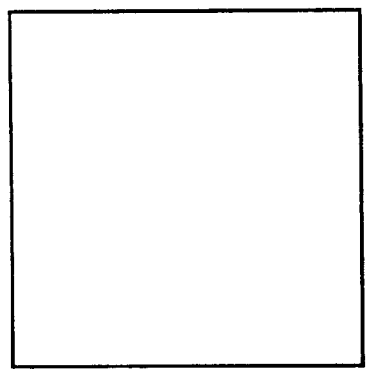
FIG. 2A is a top view of one possible representation of the synthetic environment being generated.

Another aspect of the present invention which bears greater explanation is shown in FIG. 2A. FIG. 2A is a representation of the entire synthetic environment, and which is shown in this example as being a square. It should now be obvious that the synthetic environment can have any desired shape. When the synthetic environment is localized, the synthetic environment is divided into the smaller geographic local units as shown in FIG. 2B. Although expressed in this example as squares, this is not a limitation of the invention but is for illustration purposes only. The segmentation or tiling can continue down to any desired level, and is shown as a further level of localization in FIG. 2C.

One of the advantages of this localization is that the presently preferred embodiment does not require that each tile be completed before the database can be used. For example, only a small section of tiles might be necessary for a particular application because they are the only regions of interest where activity is to occur. Accordingly, different tiles can have different levels of detail which can still function together. The accuracy of what is shown within the different tiles can thus vary greatly. One advantage of this ability is that if only a few regions of interest are needed from the entire synthetic environment, a user does not have to wait for processing of the entire synthetic environment before the database can be used.

Another advantage of the present invention which may not be obvious is that the system allows any type of model to be used within the database. In other words, a user is not restricted to the type of model that can be used to define the source data. Furthermore, the present invention processes all of the models together, instead of completely processing a model and then going back to vector feature data and beginning with a different model type.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for generating abstract models from vector features and elevation data wherein a single source of information can be manipulated to thereby generate a plurality of different abstract models, said method comprising the steps of:
    (1) providing at least one set of two-dimensional (2D) vector feature source information;
    (2) selecting from a plurality of different fundamental model types a desired feature model which is to be generated from the at least one set of 2D vector feature source information;
    (3) processing the at least one set of 2D vector feature source information to thereby generate the desired feature model;
    (4) providing at least one set of elevation data;
    (5) selecting from a plurality of different terrain surface models a desired terrain surface model which is to be generated from the at least one set of elevation data; and
    (6) processing the at least one set of elevation data to thereby generate the desired terrain surface model.

2. The method as defined in claim 1 wherein the step of selecting the desired feature model further comprises the step of selecting a desired feature model which contains a plurality of sub-models.

3. The method as defined in claim 1 wherein the method further comprises the steps of:
    (1) localizing the desired feature model by segmenting the desired feature model to obtain a feature set of regions of interest;
    (2) localizing the desired terrain surface model by segmenting the desired terrain surface model to obtain a terrain set of regions of interest; and
    (3) merging at least a portion of the feature set of regions of interest with at least a corresponding portion of the terrain set of regions of interest to thereby obtain at least a partially reconciled database of features and corresponding terrain.

4. The method as defined in claim 3 wherein the step of obtaining at least a partially reconciled database of features and corresponding terrain further comprises the step of determining feature set and terrain set interaction.

5. The method as defined in claim 4 wherein the step of determining feature set and terrain set interaction further comprises the step of determining feature set and terrain set interaction at multiple levels of detail.

6. The method as defined in claim 3 wherein the steps of localizing the desired feature model and the desired terrain surface model to thereby generate the feature and terrain set of regions of interest further comprises the step of localizing by creating a plurality of grids until reaching a desired level of grid division.

7. The method as defined in claim 3 wherein the method further comprises the step of enabling feature-feature interaction after at least two desired feature models are generated, wherein each set of 2D vector features defines attributes sufficient to enable feature models to inherently determine a result of feature-feature interaction.

8. The method as defined in claim 7 wherein the method further comprises including sufficient feature information in the at least two desired feature models such that feature-feature interaction can occur without providing a set of external interaction rules for determining results of interaction between the at least two desired feature models.

9. The method as defined in claim 7 wherein the step of enabling feature-feature interaction is caused to occur in accordance with defined behaviors in accordance with geometry and topology attributes of the different terrain surface models.

10. The method as defined in claim 1 wherein the step of selecting from the plurality of different terrain surface models the desired terrain surface model further comprises the step of treating the plurality of different terrain surface models as subsets of the plurality of different fundamental model types.

11. The method as defined in claim 3 wherein the step of obtaining the at least a partially reconciled database of features and corresponding terrain is accomplished at a last stage in database creation, thereby maximizing independence of the desired feature model by avoiding reconciliation with the desired terrain surface model until the last stage.

12. The method as defined in claim 7 wherein the method of generating the desired feature model further comprises the steps of:
    (1) selecting from the plurality of different fundamental model types a different desired feature model which is to be generated from the at least one set of 2D vector feature source information;

(2) processing the at least one set of 2D vector feature source information to generate the different desired feature model; and (3) repeating steps (1) and (2) to thereby generate any desired number or type of desired feature model from the at least one set of 2D vector feature source information without having to process any feature model completely.

13. The method as defined in claim 12 wherein the step of enabling feature-feature interaction further comprises the step of enabling feature-feature interaction regardless of the types of feature models which are being caused to interact.

14. The method as defined in claim 3 wherein the method further comprises the step of enabling terrain-terrain interaction at any step in the method, wherein a plurality of terrain surface models are able to define how interaction will occur in accordance with attributes possessed by each of the plurality of terrain surface models.

15. The method as defined in claim 3 wherein the method further comprises the step of enabling terrain-terrain interaction after at least two desired terrain models are generated, wherein each set of elevation data defines attributes sufficient to enable terrain models to inherently determine a result of terrain-terrain interaction.

16. The method as defined in claim 3 wherein the step of obtaining the at least a partially reconciled database of features and corresponding terrain is accomplished at a last stage in database creation, thereby maximizing independence of the desired terrain surface model by avoiding reconciliation with the desired feature model until the last stage.

17. The method as defined in claim 14 wherein the method of generating the desired terrain surface model further comprises the steps of:

(1) selecting from the plurality of different terrain surface model types a different desired terrain surface model which is to be generated from the at least one set of elevation data;

(2) processing the at least one set of elevation data to generate the different desired terrain surface model; and (3) repeating steps (1) and (2) to thereby generate any desired number or type of desired terrain model from the at least one set of elevation data without having to process any terrain surface model completely.

18. The method as defined in claim 17 wherein the step of enabling terrain-terrain interaction further comprises the step of enabling terrain-terrain interaction regardless of the types of terrain surface models which are being caused to interact.

19. The method as defined in claim 3 wherein the method further comprises the steps of:

(1) determining that at least one more different feature model is required in a new database after obtaining the at least a partially reconciled database of features and corresponding terrain;

(2) selecting from the plurality of different fundamental model types the at least one more different feature model which is to be generated from the at least one set of 2D vector feature source information;

(3) processing the at least one set of 2D vector feature source information to thereby generate the at least one more different feature model;

(4) localizing the at least one more different feature model by segmenting the at least one more different feature model to the feature set of regions of interest; and (5) merging at least a portion of the feature set of regions of interest with at least a corresponding portion of the terrain set of regions of interest to thereby obtain the new database which is at least a partially reconciled database of features and corresponding terrain which contains the at least one more different feature model.

20. The method as defined in claim 9 wherein the step of using defined behaviors further comprises the step of creating a plurality of parametric feature models, wherein a choice of which parametric feature models to apply in feature-feature interaction is determined by what particular data from the 2D vector feature source information was used to create the different fundamental model types which are interacting.

21. A method for generating abstract models from vector features and elevation data, wherein the abstract models are able to negotiate interaction in accordance with rules of interaction which are based upon previously defined behaviors, said method comprising the steps of:

(1) creating a plurality of feature models, wherein each of the plurality of feature models has associated therewith the previously defined behavior for a particular type of feature model;

(2) creating a plurality of terrain surface models, wherein each of the plurality of terrain surface models has associated therewith the previously defined behavior for a particular type of terrain surface model;

(3) causing the plurality of feature models to determine which interact with each other, and negotiating interaction in accordance with the previously defined behavior;

(4) causing the plurality of terrain surface models to determine which interact with each other, and negotiating interaction in accordance with the previously defined behavior; and (5) reconciling the plurality of feature models and the plurality of terrain surface models by causing them to determine which interact with each other, negotiating interaction in accordance with the previously defined behavior, and thereby generating a database of features and terrain.

22. The method as defined in claim 21 wherein the method further comprises the step of localizing the plurality of feature models and the plurality of terrain surface models before causing interaction therebetween.

23. The method as defined in claim 21 wherein the method further comprises the steps of:

(1) determining that at least one more different feature model is required in the features and terrain database;

(2) generating the at least one more different feature model;

(3) localizing the at least one more different feature model; and (4) merging the at least one more different feature model with the plurality of feature models and the plurality of terrain surface models to thereby modify the features and terrain database to include the at least one more different feature model.

24. The method as defined in claim 21 wherein the method further comprises the step of rendering the database of features and terrain in accordance with a selectable level of detail, wherein the database of features and terrain provides level of detail information for all selectable levels thereof.

25. The method as defined in claim 21 wherein the method further comprises the step of defining behavior in terms of geometry, attributes and topology of the features models.

26. The method as defined in claim 25 wherein the method further comprises the step of generating a parametric feature model which includes attributes which determine behavior of the plurality of terrain surface models.

27. The method as defined in claim 26 wherein the step of selecting the parametric feature model for a terrain surface model further comprises the step of first classifying the vector feature which then determines which type of parametric feature model is to be applied.

28. The method as defined in claim 21 wherein the method further comprises the step of maintaining a back reference between each of the plurality of vector features and the database of features and terrain such that each of the plurality of vector features can be modified without having to regenerate the database of features and terrain.

29. The method as defined in claim 21 wherein the method further comprises the step of maintaining a back reference between each of the plurality of terrain surface models and the database of features and terrain such that each of the plurality of terrain surface models can be modified without having to regenerate the database of features and terrain.

30. The method as defined in claim 22 wherein the method further comprises the step of providing a method for incrementally updating any selected portion of the localized plurality of terrain surface models to thereby enable any single localized area to be included in the database of features and terrain.

31. The method as defined in claim 30 wherein the method further comprises the step of providing the database of features and terrain, wherein said database does not require that all of the localized terrain surface models be included in the database for the database to be functional.

32. The method as defined in claim 30 wherein the method further comprises the step of utilizing time stamping of the plurality of feature models and of the plurality of terrain surface models to enable the incremental updating of the database of features and terrain.

33. The method as defined in claim 21 wherein the method further comprises the step of providing a bi-directional connection between the database of features and terrain and each of the plurality of vector features so that if one of the plurality of vector features requires modification, it is possible to return to any step in a process of generating the plurality of feature models and making a modification thereto.

34. The method as defined in claim 21 wherein the method further comprises the step of automating the generation of the database of features and terrain such that said database can be generated without intervention by a user regarding feature-feature interaction, terrain-terrain interaction, or localization.

35. The method as defined in claim 21 wherein the method further comprises the step of achieving correlation, wherein a set of the plurality of feature models all based on a same feature are all coordinated because of full attribution of the plurality of feature models.

* * * * *